(12) United States Patent
Tatum et al.

(10) Patent No.: US 9,009,040 B2
(45) Date of Patent: Apr. 14, 2015

(54) TRAINING A TRANSCRIPTION SYSTEM

(75) Inventors: Todd C. Tatum, San Jose, CA (US);
Michael A. Ramalho, Sarasota, FL (US); Paul M. Dunn, Bainbridge Island, WA (US); Shantanu Sarkar, San Jose, CA (US); Tyrone T. Thorsen, Seattle, WA (US); Alan D. Gatzke, Bainbridge Island, WA (US)

(73) Assignee: Cisco Technology, Inc., San Jose, CA (US)

( * ) Notice: Subject to any disclaimer, the term of this patent is extended or adjusted under 35 U.S.C. 154(b) by 357 days.

(21) Appl. No.: 12/774,054

(22) Filed: May 5, 2010

(65) Prior Publication Data

US 2011/0276325 A1 Nov. 10, 2011

(51) Int. Cl.
*G10L 15/00* (2013.01)
*G10L 15/07* (2013.01)
*G10L 15/06* (2013.01)

(52) U.S. Cl.
CPC ......... *G10L 15/07* (2013.01); *G10L 2015/0638* (2013.01)

(58) Field of Classification Search
CPC . G10L 15/265; G10L 15/22; H04M 2201/40; H04M 2201/60; G06F 17/30746
USPC ........................................................ 704/235
See application file for complete search history.

(56) References Cited

U.S. PATENT DOCUMENTS

| | | | | |
|---|---|---|---|---|
| 6,088,671 A * | 7/2000 | Gould et al. | ................. | 704/235 |
| 6,122,613 A * | 9/2000 | Baker | ............................ | 704/235 |
| 6,122,614 A * | 9/2000 | Kahn et al. | .................... | 704/235 |
| 6,289,085 B1 * | 9/2001 | Miyashita et al. | ......... | 379/88.02 |
| 6,442,518 B1 * | 8/2002 | Van Thong et al. | ........... | 704/235 |
| 6,442,519 B1 * | 8/2002 | Kanevsky et al. | ............. | 704/243 |
| 6,535,849 B1 * | 3/2003 | Pakhomov et al. | ........... | 704/235 |
| 6,751,590 B1 * | 6/2004 | Chaudhari et al. | ............ | 704/246 |
| 6,766,295 B1 * | 7/2004 | Murveit et al. | ................ | 704/243 |
| 6,941,264 B2 * | 9/2005 | Konopka et al. | .............. | 704/243 |
| 6,999,925 B2 * | 2/2006 | Fischer et al. | ................. | 704/243 |
| 7,225,125 B2 * | 5/2007 | Bennett et al. | ................. | 704/233 |
| 7,236,580 B1 * | 6/2007 | Sarkar et al. | ............. | 379/202.01 |
| 7,236,931 B2 * | 6/2007 | He et al. | ......................... | 704/235 |
| 7,272,558 B1 * | 9/2007 | Soucy et al. | ................... | 704/235 |
| 7,292,977 B2 * | 11/2007 | Liu | ............................... | 704/236 |
| 7,295,970 B1 * | 11/2007 | Gorin et al. | .................... | 704/221 |
| 7,340,396 B2 * | 3/2008 | Thomson et al. | .............. | 704/234 |
| 7,415,409 B2 * | 8/2008 | Simoneau et al. | ............. | 704/243 |

(Continued)

OTHER PUBLICATIONS

Peskin, Barbara, et al., "*Topic and Speaker Identification via Large Vocabulary Continuous Speech Recognition*", Human Language Technology Conference, Proceedings of the Workshop on Human Language Technology, www.aclweb.org/anthology-new/H/H93-1023, pp. 119-124.

*Primary Examiner* — Pierre-Louis Desir
*Assistant Examiner* — Fariba Sirjani
(74) *Attorney, Agent, or Firm* — Baker Botts L.L.P.

(57) ABSTRACT

According to certain embodiments, training a transcription system includes accessing recorded voice data of a user from one or more sources. The recorded voice data comprises voice samples. A transcript of the recorded voice data is accessed. The transcript comprises text representing one or more words of each voice sample. The transcript and the recorded voice data are provided to a transcription system to generate a voice profile for the user. The voice profile comprises information used to convert a voice sample to corresponding text.

15 Claims, 2 Drawing Sheets

(56) References Cited

U.S. PATENT DOCUMENTS

| | | | |
|---|---|---|---|
| 7,475,013 B2* | 1/2009 | Rifkin | 704/238 |
| 7,490,039 B1* | 2/2009 | Shaffer et al. | 704/260 |
| 7,519,536 B2* | 4/2009 | Maes et al. | 704/270.1 |
| 7,539,086 B2* | 5/2009 | Jaroker | 369/25.01 |
| 7,555,430 B2* | 6/2009 | Murveit et al. | 704/214 |
| 7,580,836 B1* | 8/2009 | Yan | 704/244 |
| 7,590,537 B2* | 9/2009 | Kim et al. | 704/245 |
| 7,752,043 B2* | 7/2010 | Watson | 704/235 |
| 7,899,670 B1* | 3/2011 | Young et al. | 704/235 |
| 8,009,966 B2* | 8/2011 | Bloom et al. | 386/285 |
| 8,032,372 B1* | 10/2011 | Zimmerman et al. | 704/235 |
| 8,131,545 B1* | 3/2012 | Moreno et al. | 704/235 |
| 8,150,689 B2* | 4/2012 | Beach et al. | 704/235 |
| 8,155,961 B2* | 4/2012 | Tian | 704/257 |
| 8,204,737 B2* | 6/2012 | Suominen | 704/9 |
| 8,213,910 B2* | 7/2012 | Harris | 455/414.1 |
| 8,326,624 B2* | 12/2012 | Jaiswal | 704/246 |
| 8,335,688 B2* | 12/2012 | Yegnanarayanan et al. | 704/235 |
| 8,335,689 B2* | 12/2012 | Wittenstein et al. | 704/235 |
| 8,412,523 B2* | 4/2013 | Beach et al. | 704/235 |
| 8,457,964 B2* | 6/2013 | Jaiswal | 704/246 |
| 8,538,753 B2* | 9/2013 | Krishnaswamy et al. | 704/235 |
| 8,542,803 B2* | 9/2013 | Abella et al. | 379/88.13 |
| 8,762,148 B2* | 6/2014 | Onishi | 704/244 |
| 2002/0072900 A1* | 6/2002 | Keough et al. | 704/220 |
| 2003/0050777 A1* | 3/2003 | Walker, Jr. | 704/235 |
| 2003/0120489 A1* | 6/2003 | Krasnansky et al. | 704/235 |
| 2006/0041427 A1* | 2/2006 | Yegnanarayanan et al. | 704/235 |
| 2006/0069567 A1* | 3/2006 | Tischer et al. | 704/260 |
| 2006/0149558 A1* | 7/2006 | Kahn et al. | 704/278 |
| 2006/0184365 A1* | 8/2006 | Odell et al. | 704/235 |
| 2006/0235690 A1* | 10/2006 | Tomasic et al. | 704/257 |
| 2007/0143103 A1* | 6/2007 | Asthana et al. | 704/200 |
| 2008/0077406 A1* | 3/2008 | Ganong, III | 704/251 |
| 2008/0291325 A1* | 11/2008 | Teegan et al. | 348/552 |
| 2009/0119103 A1* | 5/2009 | Gerl et al. | 704/243 |
| 2009/0125309 A1* | 5/2009 | Tischer | 704/260 |
| 2009/0234648 A1* | 9/2009 | Nagatomo | 704/235 |
| 2009/0326945 A1* | 12/2009 | Tian | 704/254 |
| 2010/0063815 A1* | 3/2010 | Cloran et al. | 704/235 |
| 2010/0088096 A1* | 4/2010 | Parsons | 704/235 |
| 2010/0106497 A1* | 4/2010 | Phillips | 704/231 |
| 2010/0121637 A1* | 5/2010 | Roy et al. | 704/235 |
| 2010/0241963 A1* | 9/2010 | Kulis et al. | 715/727 |
| 2010/0250243 A1* | 9/2010 | Schalk et al. | 704/201 |
| 2010/0268534 A1* | 10/2010 | Kishan Thambiratnam et al. | 704/235 |
| 2010/0312563 A1* | 12/2010 | Zhao et al. | 704/260 |
| 2011/0022387 A1* | 1/2011 | Hager | 704/235 |
| 2011/0040554 A1* | 2/2011 | Audhkhasi et al. | 704/9 |
| 2011/0054893 A1* | 3/2011 | Williams et al. | 704/235 |
| 2011/0054899 A1* | 3/2011 | Phillips et al. | 704/235 |
| 2011/0066433 A1* | 3/2011 | Ljolje et al. | 704/236 |
| 2011/0112832 A1* | 5/2011 | Prorock et al. | 704/235 |
| 2011/0131144 A1* | 6/2011 | Ashour et al. | 705/319 |
| 2011/0161080 A1* | 6/2011 | Ballinger et al. | 704/235 |
| 2011/0313764 A1* | 12/2011 | Bacchiani et al. | 704/235 |
| 2012/0136664 A1* | 5/2012 | Beutnagel et al. | 704/260 |
| 2012/0232898 A1* | 9/2012 | Di Fabbrizio et al. | 704/235 |
| 2012/0253811 A1* | 10/2012 | Breslin et al. | 704/249 |
| 2013/0013306 A1* | 1/2013 | Zimmerman et al. | 704/235 |
| 2013/0289985 A1* | 10/2013 | Williams et al. | 704/235 |

* cited by examiner

TRAINING A TRANSCRIPTION SYSTEM

TECHNICAL FIELD

The present disclosure relates generally to transcription systems.

BACKGROUND

Transcription systems transcribe speech to text by translating spoken words into corresponding written words. Transcription systems may be speaker dependent or speaker independent. In general, a speaker independent transcription system is not customized for a particular person. A speaker dependent transcription system, however, may be trained to customize the system to a particular person.

DESCRIPTION OF EXAMPLE EMBODIMENTS

Overview

According to certain embodiments, training a transcription system includes accessing recorded voice data of a user from one or more sources. The recorded voice data comprises voice samples. A transcript of the recorded voice data is accessed. The transcript comprises text representing one or more words of each voice sample. The transcript and the recorded voice data are provided to a transcription system to generate a voice profile for the user. The voice profile comprises information used to convert a voice sample to corresponding text.

Description

Figure 1:
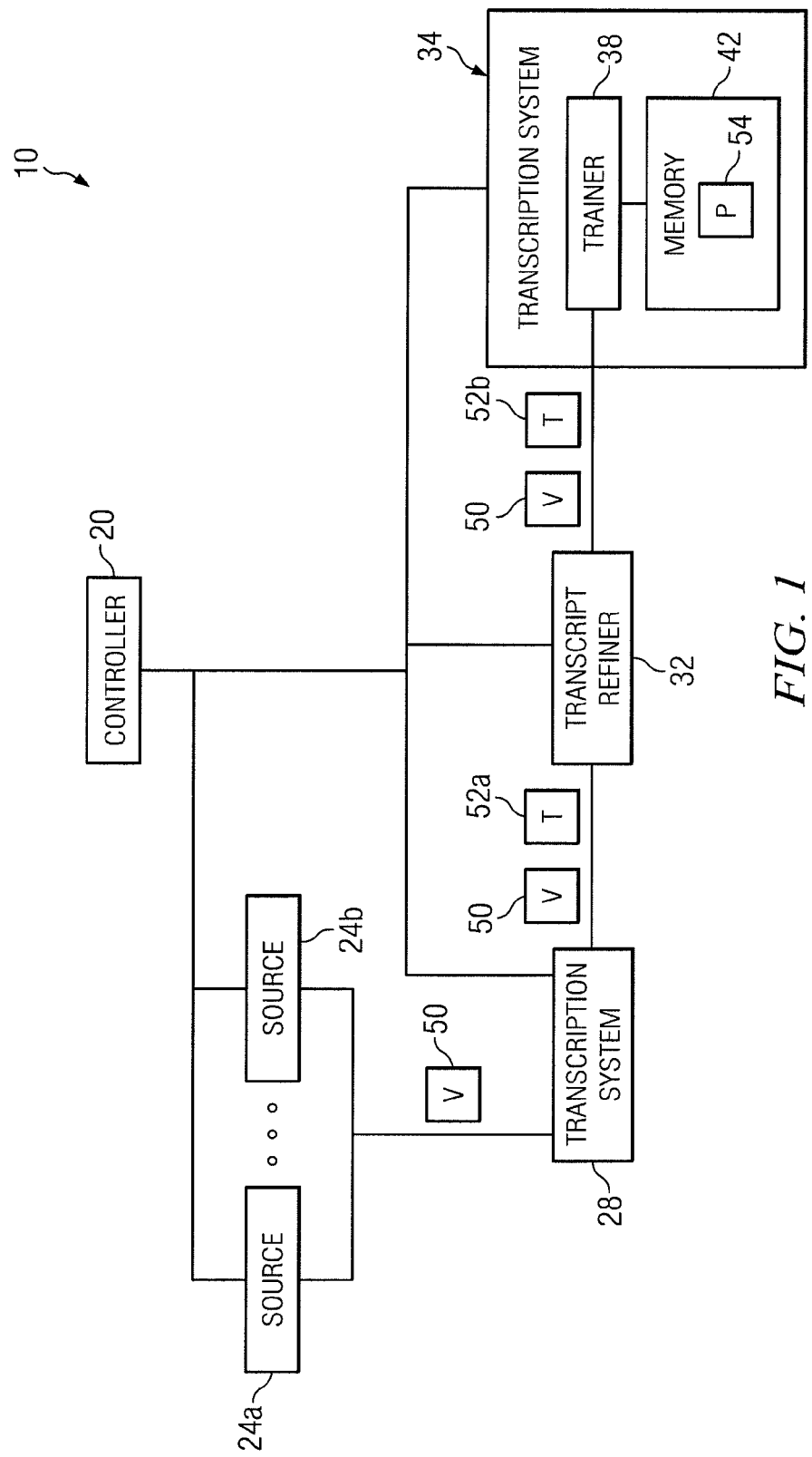
FIG. 1 illustrates an example of a system that may be used to train a transcription system.

FIG. 1 illustrates an example of a system 10 that may be used to train a transcription system. In the illustrated embodiment, system 10 includes a controller 20, one or more sources 24 (24a-b), a transcription system 28, a transcript refiner 32, and a transcription system 34 (which includes trainer 38 and a memory 42) coupled as illustrated.

In certain embodiments, system 10 accesses recorded voice data 50 comprising voice samples of a user from one or more sources 24. In the embodiments, system 10 accesses a transcript 52 of the recorded voice data that transcribes each voice sample to text. In the embodiments, system 10 provides transcript 52 and recorded voice data 50 to a transcription system 34 to generate a voice profile 54 for the user. Voice profile 54 comprises information that may be used to convert a voice sample to corresponding text. In the embodiments, transcription system 34 may be efficiently trained. In certain embodiments, controller 20 of system 10 may perform the operations of system 10.

In certain embodiments, a source 24 may be a device that stores and/or provides recorded voice data 50. In certain embodiments, a source 24 may also store and/or provide transcriptions of the recorded voice data 50. A source 24 may be a database that has memory configured to store voice data, such as a voicemail system that collects recordings of voicemail messages. In certain embodiments, sources 24 may conform to one or more policies, such as security, message retention, or other suitable policies.

In certain embodiments, recorded voice data 50 comprises audio signals of human speech spoken by a user that have been recorded. A user may refer to a person or an account (such as a telephone or voicemail account) of the person. Examples of recorded voice data 50 may comprise at least one of the following types of voice data: a voicemail, a video, a recorded telephone call, or a recorded voice. For example, recorded voice data 50 may comprise, for example, a voicemail and a video; a recorded call and a video; or one or more voicemails. A recorded call may be a recording of a call between two endpoints or more endpoints (such as a conference call).

Recorded voice data 50 comprises voice samples. A voice sample may refer to any suitable portion of recorded voice data 50. As an example, a voice sample may be a recording of one word or more words (such as a phrase). As another example, a voice sample may be a message, such as a voicemail message. As another example, a voice sample may be a recording of speech of a particular user, such a portion of a conference call that includes voice data from a particular speaker.

In certain examples, recorded voice data 50 may be associated with (such as may be mapped to or may have) a user identifier identifying the user that spoke the human speech. In certain embodiments, a source may organize recorded voice data 50 and/or transcriptions according to user identifiers such that recorded voice data 50 and/or transcriptions associated with a specific user identifier maybe readily located. In certain embodiments, if the user identifier of an initial voice sample is unknown, the voice sample may be stored under a new user identifier. Additional voice samples that are associated with the initial voice sample (for example, originating from the same endpoint or having the same voice profile) may also be stored with that sample.

In certain embodiments, a device of system 10 (such as controller 20 or source 24) may determine the user identifier of the user whose voice is recorded and may associate recorded voice data 50 with the user identifier. The user identifier may be identified in any suitable manner. In certain embodiments, an origin of a voice sample may be determined, and then the user identifier associated with the origin may be identified. An origin of a voice sample may be a sender of the voice sample or may be a place from which the voice sample may be retrieved. Examples of origins include a user account, an endpoint, or other entity configured to provide voice samples. An endpoint may be a device that a user may use to input voice signals. Examples of endpoints include telephones, microphones, computers, personal digital assistants, and/or other device configured to receive, record, and/or communicate voice signals from a user.

The user identifier of the origin may be determined in any suitable manner. For example, a caller identification service may identify the user identifier of an endpoint that sent a message or from which a call was received. As another example, a voicemail system may identify the user identifier of a sender of a message. As another example, a user may manually enter a user identifier as the sender of a message. As another example, a conferencing server may record the identity of each speaker of a conference call such that user identifiers may be associated with particular portions of the call.

In other embodiments, the voice sample itself may be analyzed to determine a user identifier associated with the sample. As an example, a voice sample may be compared with voice profiles. A voice profile may include characteristics of voice signals that may be used to identify the voice of a particular user. If there is a match between the sample and a voice profile, the sample may be associated with a user identifier corresponding to the voice profile.

In certain embodiments, one or a combination of any of the previously described methods may be used to determine the user identifier corresponding to a voice sample. For example, one technique may be used, and then a second technique may be used to verify the initial results. If a voice sample is determined to record the voice of the user, the voice sample maybe added to the recorded voice data of the user.

Transcription systems 28 and 34 may be any suitable device that is configured to transcribe speech (such as recorded voice data 50) to text. Transcribing speech to text involves translating spoken words into written words. Transcription systems may be a speaker dependent or speaker independent. In general, a speaker independent transcription system is not customized for a particular user. A speaker dependent transcription system, however, may be trained to customize the system to a particular user. In certain embodiments, transcription system 28 may be a speaker independent transcription system 28 and transcription system 34 may be a speaker dependent transcription system, but any suitable combination of transcription systems may be used.

Transcript 52 (such as 52a and/or 52b) includes text transcribed from speech. The text comprises written words that have been transcribed from the spoken words. In certain embodiments, a transcript 52 includes text of transcribed voice samples. In certain embodiments, transcript 52 of particular recorded voice data 50 may be stored with the recorded voice data 50.

In certain embodiments, transcript refiner 32 refines transcript 52a to yield a more accurate transcript 52b of the recorded voice data 50. A more accurate transcription may be a transcription that correctly matches more written words with spoken words; a less accurate transcription may be a transcription that correctly matches fewer written words with spoken words. In certain embodiments, transcript refiner 32 may refine transcript by identifying incorrectly transcribed words and/or correcting the incorrectly transcribed words. As an example, transcript refiner 32 may be a human that listens to recorded voice data 50 to check transcript 52a for errors, and then corrects the errors to yield transcript 52b. As another example, transcript refiner 32 may be a device that applies transcription rules or other processes to yield a more accurate transcription.

In certain embodiments, transcript system 28 and/or transcript refiner 32 may be a part of a transcription service. In the embodiments, transcription system 28 may generate a transcript 52a and flag portions designated as low accuracy (such as less then 80% confidence accuracy). The flagged portions may be sent to a human who checks the portions for accuracy and corrects them if needed.

In certain embodiments, transcript system 34 may be a speaker dependent transcription system. Transcription system 34 includes a trainer 38 and a memory 42 that stores a voice profile 54. Trainer 38 creates a voice profile 54 for a particular user in any suitable manner. In certain embodiments, trainer 38 determines text (such as written words) that corresponds to voice samples (such as spoken words). Trainer 38 generates information about the speech of the user and stores the information in voice profile 54.

Trainer 38 may determine text that corresponds to voice samples in any suitable manner. In certain examples, text mapped to corresponding voice samples may be input into transcription system 34. For example, transcription system 34 may receive recorded voice data 50 with transcript 52 that transcribes the recorded voice data. In other examples, a user may read known text to create recorded voice data of spoken words that correspond to the written words of the text. In certain embodiments, trainer 38 may utilize a list of phonetically balanced words. A phonetically balanced word list includes words that approximate the relative frequency of phoneme occurrence in a particular language. In certain embodiments, trainer 38 may utilize segments of voice data 50 that include some, most, or all phoneme combinations used within a particular language. Examples of phonemes include not only phonemes, but also di-phones (groups of two basic phonemes), tri-phones, or any other fundamental phonetic unit of a transcription system.

In certain embodiments, transcription system 34 may have a dictionary from which transcription system 34 selects words for transcript 52. The words may be common words, that is, words that are more likely to be used. In certain embodiments, transcription system 34 may include a customized dictionary that includes words commonly used by a particular user. In the embodiments, controller 20 may provide text communication of the user to transcription system 34. Transcription system 34 may use the text communication in order to identify words commonly used by the user. Examples of text communication include messages (such as email or text messages), documents, or any other text generated by the user.

Controller 20 may control one or more operations of system 10. As an example, controller 20 may perform the operations of the example method of FIG. 2. In the embodiments, controller 20 may send instructions to one or more components of system 10 in order to perform the operations. For example, controller 20 may instruct sources 24, transcription system 28, and/or transcript refiner 32 to provide transcript 52 and recorded voice data 50 to transcription system 34, and may instruct transcription system 34 to generate a voice profile 54 for the user.

Controller 20 may provide transcript 52 and recorded voice data 50 to transcription system 34 one or more times. For example, controller 20 may provide additional transcripts 52 and recorded voice data 50 to allow transcription system 34 to yield a more accurate voice profile 54 with more accurate and/or more comprehensive mappings. In certain embodiments, voice profile 54 may be able to provide transcriptions above a particular accuracy threshold, for example, a threshold in the range of 90 to 95 percent or 95 percent or greater. When voice profile 54 is sufficiently accurate, voice samples may be sent directly to transcription system 34 for transcription, bypassing transcription system 28 and/or transcript refiner 32.

Figure 2:
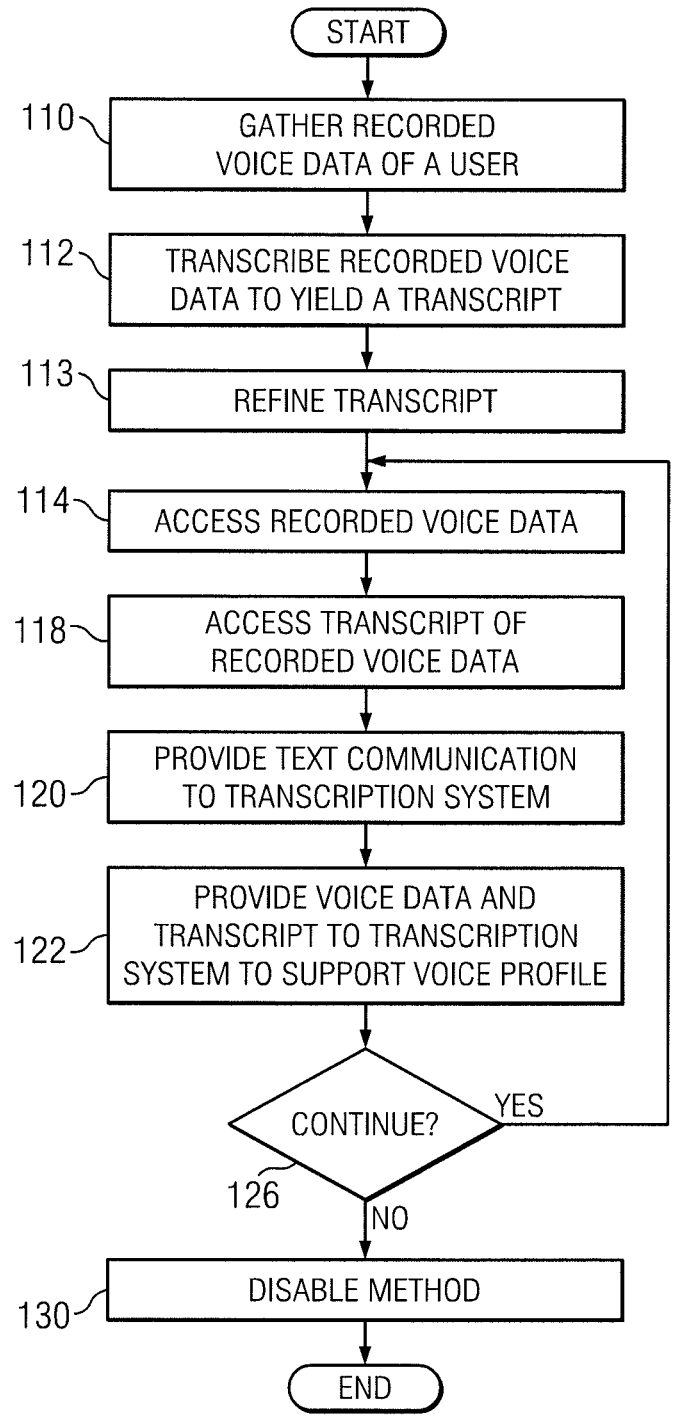
FIG. 2 illustrates an example of a method for training a transcription system.

FIG. 2 illustrates an example of a method for training a transcription system. Certain steps of the method may be performed by controller 20 of system 10 of FIG. 1 to train transcription system 34. The method starts at step 110, where recorded data 50 of a user is gathered. In certain embodiments, sources 24 may gather data 50. Recorded voice data 50 is transcribed at step 112 to yield a transcript 52. In certain embodiments, transcription system 28 may transcribe recorded voice data 50. Transcript 52a is refined at step 113 to yield a more accurate transcript 52b. In certain embodiments, transcript refiner 32 may refine transcript 52a.

Recorded voice data 50 is accessed at step 114, and transcript 52 of recorded voice data 50 is accessed at step 118. In certain embodiments, controller 20 may access recorded voice data 50 and transcript 52 stored under the same user identifier. Text communication is provided to transcription system 34 at step 120. In certain embodiments, controller 20 may provide text communication, which may be used to identify common words of the user to generate voice profile 54.

Transcript 52 and recorded voice data 50 are provided to transcription system 34 at step 122 to support (for example, generate and/or update) voice profile 54 for the user. In certain embodiments, controller 20 provides portions of transcript 52 and recorded voice data 50 that include phonetically balanced words. Any suitable transport mechanism may be used to communicate recorded voice data 50 and/or transcript 52. Examples of such transport mechanisms include simple mail transfer protocol (SMTP) and hypertext transfer protocol (HTTP).

The method may continue at step 126. If the method continues, the method returns to step 114, where more recorded voice data 50 is received. Steps 114 to 122 may be performed as described previously in order to update voice profile 54. If the method is not to continue at step 126, the method proceeds to step 130.

The providing the transcript 52 and the recorded voice data 50 to transcription system 34 may be disabled at step 130 such that transcripts 52 and/or recorded voice data 50 are no longer provided to transcription system 34. These operations may be disabled if, for example, there are security and/or message retention concerns. The method then ends.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
accessing recorded voice data of a user from one or more sources, the recorded voice data comprising a plurality of voice samples;
accessing a transcript of the recorded voice data, the transcript comprising text representing one or more words of each voice sample;
identifying an origin of a voice sample, the origin being a device used to input the voice sample;
determining that the origin is associated with the user;
determining that the voice sample matches a voice profile of the user, wherein the voice profile comprises voice signal characteristics to identify the voice of the user and user speech information to convert the voice sample to corresponding text and;
providing electronic mail and a text message generated by the user to identify one or more words commonly used by the user, the transcript, and the recorded voice data to a transcription system to generate an updated voice profile for the user;
determining portions of the transcript that are transcribed at a low confidence of accuracy;
flagging the portions of the transcript that are transcribed at a low confidence of accuracy; and
communicating the flagged portions of the transcript to a transcript refiner.

2. The method of claim 1, further comprising:
adding the voice sample to the recorded voice data.

3. The method of claim 1, further comprising:
determining that the voice sample records the voice of the user.

4. The method of claim 1, further comprising:
refining, by the transcript refiner, the transcript to yield a more accurate transcription of the recorded voice data.

5. The method of claim 1, further comprising:
disabling the providing the transcript and the recorded voice data to the transcription system.

6. The method of claim 1, the recorded voice data comprising at least one of the following types of voice data:
a voicemail;
a video;
a recorded call;
a recorded conference call; or
a recorded voice.

7. One or more non-transitory computer readable media storing one or more instructions, when executed by one or more processors, configured to:

access recorded voice data of a user from one or more sources, the recorded voice data comprising a plurality of voice samples;

access a transcript of the recorded voice data, the transcript comprising text representing one or more words of each voice sample;

identify an origin of a voice sample, the origin being a device used to input the voice sample;

determine that the origin is associated with the user;

determine that the voice sample matches a voice profile of the user, wherein the voice profile comprises voice signal characteristics to identify a voice of the user and user speech information to convert the voice sample to corresponding text;

provide electronic mail and a text message generated by the user to identify one or more words commonly used by the user, the transcript, and the recorded voice data to a transcription system to generate an updated voice profile for the user;

determine portions of the transcript that are transcribed at a low confidence of accuracy;

flag the portions of the transcript that are transcribed at a low confidence of accuracy; and communicate the flagged portions of the transcript to a transcript refiner.

8. The media of claim 7, the instructions configured to:
add the voice sample to the recorded voice data.

9. The media of claim 7, the instructions configured to:
determine that the voice sample records the voice of the user.

10. The media of claim 7, the instructions configured to:
refine, by the transcript refiner, the transcript to yield a more accurate transcription of the recorded voice data.

11. The media of claim 7, the instructions configured to:
disable the providing the transcript and the recorded voice data to the transcription system.

12. The media of claim 7, the recorded voice data comprising at least one of the following types of voice data:
a voicemail;
a video;
a recorded call;
a recorded conference call; or
a recorded voice.

13. An apparatus comprising:
a memory configured to store computer executable instructions; and
one or more processors coupled to the memory, the processors configured, when executing the instructions, to:
access recorded voice data of a user from one or more sources, the recorded voice data comprising a plurality of voice samples;
access a transcript of the recorded voice data, the transcript comprising text representing one or more words of each voice sample;
identify an origin of a voice sample, the origin being a device used to input the voice sample;
determine that the origin is associated with the user;
determine that the voice sample matches a voice profile of the user, wherein the voice profile comprises voice signal characteristics to identify a voice of the user and user speech information to convert the voice sample to corresponding text;
provide electronic mail and a text message generated by the user to identify one or more words commonly used by the user, the transcript, and the recorded voice data to a transcription system to generate an updated voice profile for the user;
determine portions of the transcript that are transcribed at a low confidence of accuracy; and
flag the portions of the transcript that are transcribed at a low confidence of accuracy; and
communicate the flagged portions of the transcript to a transcript refiner.

14. The apparatus of claim 13, the processors configured to:
add the voice sample to the recorded voice data.

15. The apparatus of claim 13, the processors configured to:
refine, by the transcript refiner, the transcript to yield a more accurate transcription of the recorded voice data.

* * * * *